United States Patent [19]

Kinoshita et al.

[11] Patent Number: 5,915,248
[45] Date of Patent: Jun. 22, 1999

[54] DATA SEARCHING APPARATUS

[75] Inventors: Tetsuya Kinoshita, Urawa; Takamasa Oyama, Kamakura; Chuichi Kikuchi, Ichikawa, all of Japan

[73] Assignee: Matsushita Electric Industrial Co., Ltd., Osaka, Japan

[21] Appl. No.: 08/797,085

[22] Filed: Feb. 10, 1997

[30] Foreign Application Priority Data

Mar. 12, 1996 [JP] Japan .................................. 8-054588

[51] Int. Cl.⁶ .................................................. G06F 17/30
[52] U.S. Cl. ........................ 707/1; 707/2; 707/3; 707/4; 707/200
[58] Field of Search ............................. 707/3, 4, 8, 202, 707/100, 1, 2, 200; 705/1

[56] References Cited

U.S. PATENT DOCUMENTS

| 5,164,897 | 11/1992 | Clark et al. | 705/1 |
| 5,257,365 | 10/1993 | Powers et al. | 707/100 |
| 5,628,009 | 5/1997 | Kikuta et al. | 707/100 |
| 5,640,561 | 6/1997 | Satah et al. | 707/202 |
| 5,717,919 | 2/1998 | Kodavalla et al. | 707/8 |
| 5,734,886 | 3/1998 | Grosse et al. | 707/4 |

FOREIGN PATENT DOCUMENTS 9429808  12/1994  WIPO .

OTHER PUBLICATIONS

Anonymous: "File Organization for Both Context and Line No. Editing. Dec. 1971.", IBM Technical Disclosure Bulletin, vol. 14, No. 7, Dec. 1971, pp. 2175—2176, XP002082421, New York, US.

Kimbrell R. E.: "Searching For Text?. Send An N–Gram", Byte, vol.13, No. 5, May 1, 1998, pp. 297—312, XP000576194.

Chou Y –H et al.: "Greedy File—A New Data Organization Concept for Partial Match Retrieval", Proceedings of the Annual International Computer Software and Applications Conference. (Compsac), Orlando, Sept. 20–22, 1989, No. Conf. 13, Sep. 20, 1989, pp. 263—270, XP000091515, Knafl G J.

Primary Examiner—Maria N. Von Buhr
Assistant Examiner—Cheryl Lewis
Attorney, Agent, or Firm—Pollock, Vande Sande & Amernick

[57] ABSTRACT

A data searching apparatus is disclosed which comprises: a request receiving portion for receiving a searching request including searching data and a registering request; a record number providing portion responsive to the registering request for providing record number data to each record which is a unit of data to be registered; a relatively-numbering portion for grouping the record number data into groups and converting the record number data into group number data and relative record number data within each of the groups; an index file generation portion for generating an index file from the data and the relative record number data; an index file storing portion for storing the index file; an index file searching portion for searching one of records indicated by the searching data in accordance with the index file in the index file storing portion in response to the searching request from the request receiving portion; an absolutely-numbering portion for converting the relative number data and group number data of the searched one of record into the record number data; and a searching result outputting portion for outputting a searching result in accordance with the record number data from the absolutely-numbering portion.

8 Claims, 16 Drawing Sheets

FIG. 3
DOCUMENT 1
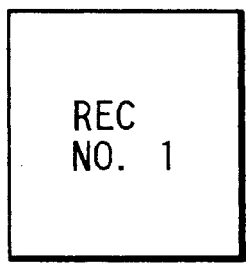
PAGE 1
DOCUMENT 1
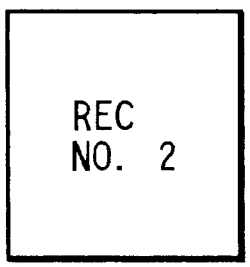
PAGE 2
DOCUMENT 2
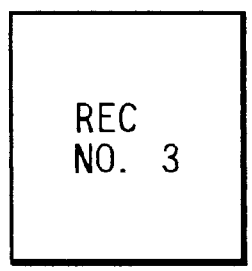
PAGE 1
DOCUMENT 2
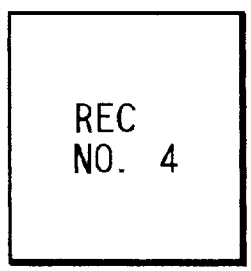
PAGE 2
DOCUMENT 2
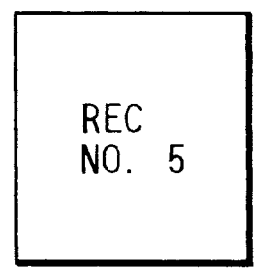
PAGE 3
DOCUMENT 3
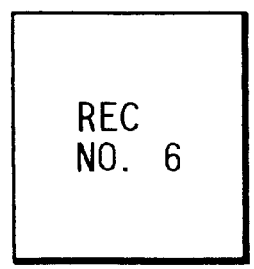
PAGE 1

FIG. 4

| REC NO. | DOCUMENT NO. | PAGE NO. |
|---|---|---|
| 1 | 1 | 1 |
| 2 | 1 | 2 |
| 3 | 2 | 1 |
| 4 | 2 | 2 |
| 5 | 2 | 3 |
| 6 | 3 | 1 |
|  | ⋮ |  |

FIG. 6

THE NO. OF APPEARANCE TIMES
DATA OF A CHARACTER CHAIN (A, B)

| |
|---|
| THE NO. OF APPEARANCE TIMES DATA N OF GROUP 1 |
| THE NO. OF APPEARANCE TIMES DATA OF RELATIVE REC NO. 1 |
| THE NO. OF APPEARANCE TIMES DATA OF RELATIVE REC NO. 2 |
| ⋮ |
| THE NO. OF APPEARANCE TIMES DATA OF RELATIVE REC NO. N |
| THE NO. OF APPEARANCE TIMES DATA M OF GROUP 2 |
| THE NO. OF APPEARANCE TIMES DATA OF RELATIVE REC NO. 1 |
| THE NO. OF APPEARANCE TIMES DATA OF RELATIVE REC NO. 2 |
| ⋮ |
| THE NO. OF APPEARANCE TIMES DATA OF RELATIVE REC NO. M |
| ⋮ |
| THE NO. OF APPEARANCE TIMES DATA P OF GROUP L |
| ⋮ |

FIG. 7A

| CHR TRAIN | a | b | a | a | b | c | a | c |
|---|---|---|---|---|---|---|---|---|
| THE NO. OF APPEARANCE TIMES | 1 | 1 | 2 | 3 | 2 | 1 | 3 | 2 |

FIG. 7B

| CHR CHAIN | THE NO. OF APPEARANCE TIMES DATA |
|---|---|
| (a, a) | (2, 3) |
| (a, b) | (1, 1)  (3, 2) |
| (a, c) | (3, 2) |
| | ⋮ |
| (b, a) | (1, 2) |
| (b, c) | (2, 1) |
| | ⋮ |
| (c, a) | (1, 3) |
| | ⋮ |

FIG. 8

THE NO. OF APPEARNCE TIMES DATA OF CHR CHAIN (a, b)

INDEX DATA AREA 62

| THE NO. OF PIECES OF THE NO. OF APPEARANCE TIMES DATA IN GROUP 1 = 6 | |
|---|---|
| (1, 1) | 1 |
| (2, 2) | 1 |
| (3, 4) | 1 |
| (4, 5) | 1 |
| (2, 2) | 2 |
| (3, 4) | 2 |
| THE NO. OF PIECES OF THE NO. OF APPEARANCE TIMES DATA IN GROUP 2 = 4 | |
| (1, 2) | 1 |
| (2, 3) | 1 |
| (2, 2) | 2 |
| (4, 4) | 2 |
| ⋮ | |

INDEX FILE

HEADER 60
REC NO.
COM1
COM2

THE NO. OF APPEARNCE TIMES DATA OF CHR CHAIN (b, c)

| THE NO. OF PIECES OF THE NO. OF APPEARANCE TIMES DATA IN GROUP 1 = 5 | |
|---|---|
| (2, 1) | 1 |
| (3, 2) | 1 |
| (5, 3) | 1 |
| (3, 1) | 2 |
| (4, 2) | 2 |
| THE NO. OF PIECES OF THE NO. OF APPEARANCE TIMES DATA IN GROUP 2 = 5 | |
| (1, 1) | 1 |
| (3, 2) | 1 |
| (4, 3) | 1 |
| (1, 2) | 2 |
| (4, 3) | 2 |
| ⋮ | |

INDEX FILE

FIG. 13
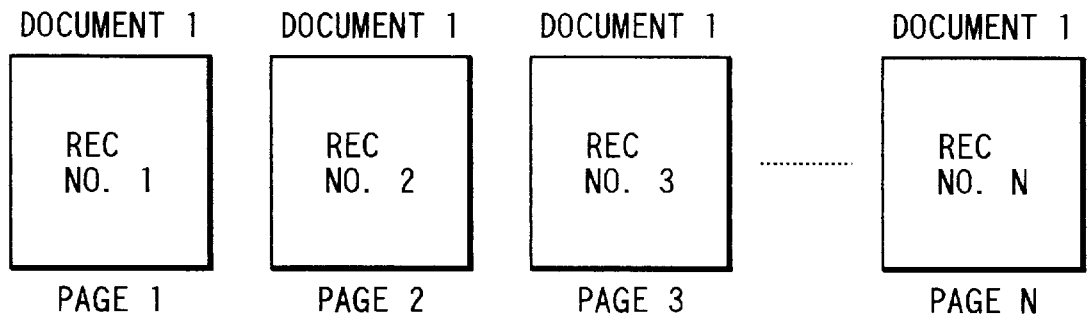
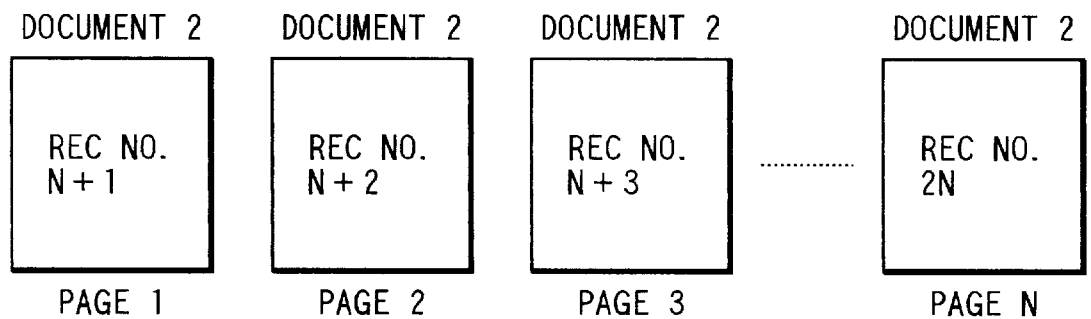
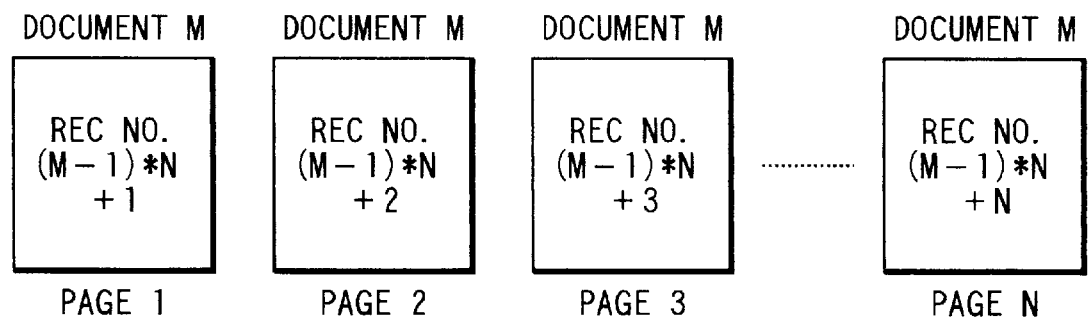

FIG. 15

THE NO. OF APPEARANCE TIMES DATA OF CHR CHAIN (A, B)

| |
|---|
| THE NO. OF APPEARANCE TIMES DATA N OF GROUP 1 |
| THE NO. OF APPEARANCE TIMES DATA OF RELATIVE REC NO. L1 |
| THE NO. OF APPEARANCE TIMES DATA OF RELATIVE REC NO. L2 |
| ⋮ |
| THE NO. OF APPEARANCE TIMES DATA OF RELATIVE REC NO. LN |
| INSERTING REGION |
| INSERTING REGION |
| INSERTING REGION |
| THE NO. OF APPEARANCE TIMES DATA M IN GROUP 2 |
| THE NO. OF APPEARANCE TIMES DATA OF RELATIVE REC NO. L1 |
| ⋮ |
| THE NO. OF APPEARANCE TIMES DATA OF RELATIVE REC NO. LM |
| INSERTING REGION |
| INSERTING REGION |
| INSERTING REGION |
| ⋮ |

FIG. 16

THE NO. OF APPEARNCE TIMES
DATA OF CHR CHAIN (a, b)

| THE NO. OF PIECES OF THE NO. OF APPEARANCE TIMES DATA IN GROUP 1 = 8 | |
|---|---|
| (1, 1) | 1 |
| (2, 2) | 1 |
| (3, 4) | 1 |
| (4, 5) | 1 |
| (2, 2) | 2 |
| (3, 4) | 2 |
|  |  |
|  |  |
| THE NO. OF PIECES OF THE NO. OF APPEARANCE TIMES DATA IN GROUP 2 = 6 | |
| (1, 2) | 1 |
| (2, 3) | 1 |
| (2, 2) | 2 |
| (4, 4) | 2 |
|  |  |
|  |  |
| ⋮ | |

REC NO.

INSERTING REGION

FIG. 17 PRIOR ART

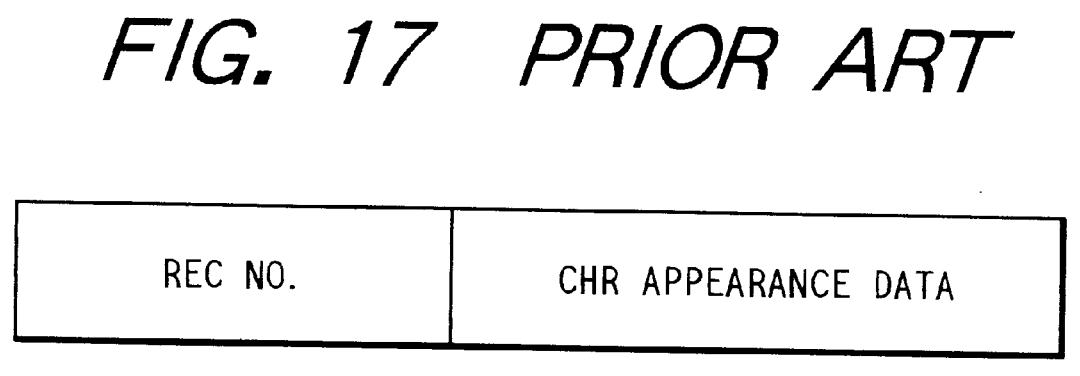

| REC NO. | CHR APPEARANCE DATA |
|---|---|

DATA SEARCHING APPARATUS

BACKGROUND OF THE INVENTION

1. Field of the Invention

This invention relates to a data searching apparatus for providing data for data-searching in response to a request.

2. Description of the Prior Art

A data searching apparatus for dividing a document to be registered in a data base into records, numbering the records, and storing the record number data in order to manage the registered document is known, wherein each of records is a unit of data stored in the data base for registering and searching.

Such a conventional data searching apparatus stores the record number and character appearance data of the record in a predetermined memory area. FIG. 17 is an illustration of a data format of an index file used by a prior art data searching apparatus.

In FIG. 17, the predetermined memory area of thirty-two bits as an index file stores twenty bits of the record number data and twelve bits of character appearance data. Therefore, there is a problem that this format of index files provides a management of only 1048576 ($2^{20}$) records. Moreover, in this prior art, there is a problem that the size (bits) of the index file should be increased if the number of the records increases.

Moreover, in this prior art data searching apparatus, it is necessary to provide a correspondence table indicative of correspondence among the document number, page numbers, and record numbers. Therefore, there is a problem that it is necessary to add a new correspondence table and it is also necessary to sort the correspondence table, if the number of pages increases due to renewing a document.

SUMMARY OF THE INVENTION

The aim of the present invention is to provide an improved data searching apparatus.

According to the present invention, a first data searching apparatus is provided, which comprises: an input portion for receiving a searching request including searching request data and a registering request; a sectioning portion responsive to the registering request from the input portion for sectioning data to be registered into units of records in accordance with sectioning data included in the data; a numbering portion for grouping and numbering the records such that every predetermined number of the records is grouped into one group and for generating group number data and relative record number data resulted from the numbered and grouped records; a storing portion for storing the group number data and the relative record number data correspondingly; and a searching data generation portion for generating and outputting searching data to be used for searching one of the record in accordance with the searching request data from the input portion and the group data and relative record number data in the storing portion.

According to this invention a second data searching apparatus is provided, which comprises: a request receiving portion for receiving a searching request including searching data and a registering request; a record number providing portion responsive to the registering request for providing record number data to each record which is a unit of data to be registered; a relative numbering portion for grouping the record number data into groups and converting the record number data into group number data and relative record number data within each of the groups; an index file generation portion for generating an index file from the data and the relative record number data; an index file storing portion for storing the index file; an index file searching portion for searching one of records indicated by the searching data in accordance with the index file in the index file storing portion in response to the searching request from the request receiving portion; an absolute numbering portion for converting the relative number data and group number data of the searched one of record into the record number data; and a searching result outputting portion for outputting a searching result in accordance with the record number data from the absolute numbering portion.

The second data searching apparatus may further comprise an insertion area generation portion for providing a storing space in the index file storing portion to store the index data in the index file storing portion in the future when the index file storing portion stores the index file.

In the second data searching apparatus, the record number providing portion generates a record number correspondence table indicative of a correspondence between the record number data and sectioning data included in the data and the searching result outputting portion outputs the searching result from the record number data from the absolute numbering portion in accordance with the record number correspondence table.

In the second data searching apparatus, the index file generation portion generates the index file including at least a header for storing each of the group number data and the index data areas following to the header for storing relative record number data and corresponding index data, the header and each of the index data areas having the same size.

According to this invention, a third data searching apparatus is provided, which comprises: a request receiving portion for receiving a searching request and a registering request; a record number providing portion responsive to the registering request for providing a record number to each of the records which is a unit of data to be registered in accordance with sectioning data included in the data through a rule uniquely defining the record number data; a relative numbering portion for grouping the records such that the record numbers and at least one spare record form one of the groups and for generating group number data and corresponding relative number data from the grouped record numbers; an index file generation portion for generating an index file from the data using the relative record number data and the group number data; an index file storing portion for storing the index file; an index file searching portion for searching one of the records indicated by the searching request in accordance with the index file in the index file storing portion in response to the searching request from the request receiving portion; an absolute numbering portion for converting the relative number data and group number data of the searched one of the records into the record number data; and a searching result outputting portion for outputting a searching result in accordance with the record number data from the absolute numbering portion.

The third data searching apparatus may further comprise an insertion area generation portion for providing a storing space in the index storing portion to store the index data in the index file storing portion in future when the index file storing portion stores the index file.

BRIEF DESCRIPTION OF THE DRAWINGS

The object and features of the present invention will become more readily apparent from the following detailed description taken in conjunction with the accompanying drawings in which:

FIG. 3 is an illustration of the first embodiment showing an example condition of recorded documents;

FIG. 4 is an illustration of the first embodiment showing an example condition of a correspondence table;

FIG. 6 is an illustration of the first embodiment showing the index file;

FIG. 7A is an illustration of the first embodiment showing a relation between a train of characters and the number of appearance times;

FIG. 7B is an illustration showing a relation between a character chain including two predetermined characters and the number of appearance times data;

FIG. 8 is an illustration of this embodiment showing an index file;

FIG. 13 is an illustration of the second embodiment showing record numbers of documents;

FIG. 15 is an illustration of the third embodiment showing index files;

FIG. 16 is an illustration of the third embodiment showing data for generating an index file; and FIG. 17 is an illustration of a data format of an index file used by a prior art data searching apparatus.

The same or corresponding elements or parts are designated with like references throughout the drawings.

DETAILED DESCRIPTION OF THE INVENTION

Hereinbelow will be described a first embodiment of this invention.

Figure 1:
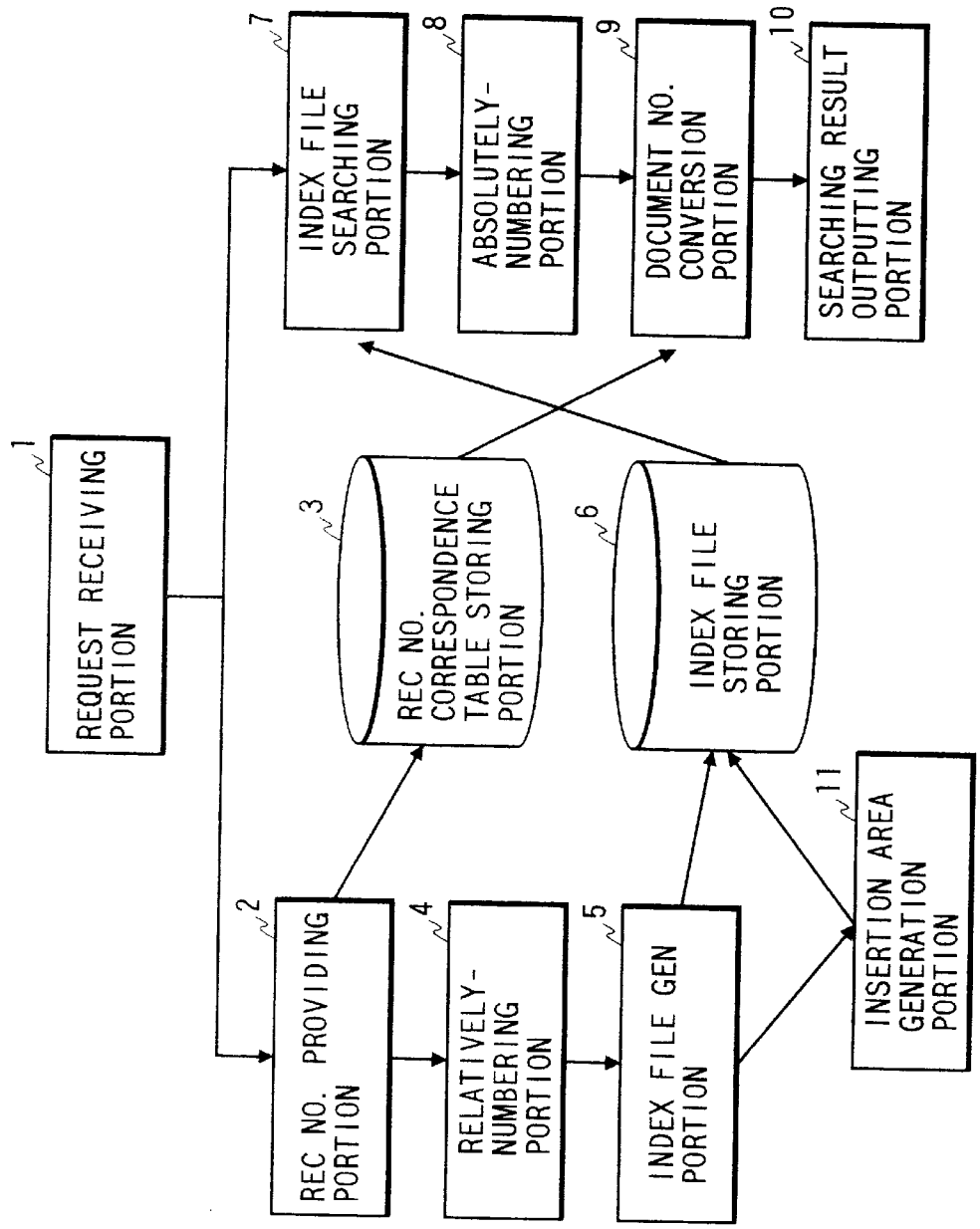
FIG. 1 is a block diagram of a data searching apparatus of a first embodiment of this invention which is also used in a third embodiment of this invention.

FIG. 1 is a block diagram of a data searching apparatus of a first embodiment of this invention which is also referred in a third embodiment.

The data searching apparatus comprises a request receiving portion 1 for receiving a request for various processings, a record number providing portion 2 for assigning record numbers (data) to a document to be registered and producing a record number correspondence table representing a correspondence among document numbers, page numbers, and record numbers, a record number correspondence table storing portion 3 for storing the record number correspondence table generated by the record number providing portion 2, a relative-numbering portion 4 for grouping the record number (data) provided by the record number providing portion 2 and converting the record number into a relative number within a group, an index file generation portion 5 for generating an index file from the relative number provided by the relative-numbering portion 4 and the registered data, an index file storing portion 6 for storing the index file generated by the index file generation portion 5, an index file searching portion 7 for effecting a search using the index file in the index file storing portion 6, an absolute numbering portion 8 for converting the relative record number searched by the index file searching portion 7 into an absolute record number, a document number conversion portion 9 for converting the record number provided by the absolute numbering portion 8 into a document number and a page number using the record number correspondence table in the record number correspondence table storing portion 3, a searching result outputting portion 10 for displaying the searched document number, and an insertion area generation portion 11 for providing a data area for storing additional data in advance while the index file generation portion 5 stores the index file into the index file storing portion 6. In the first embodiment, the insertion area generation portion 11 is not used.

Figure 2:
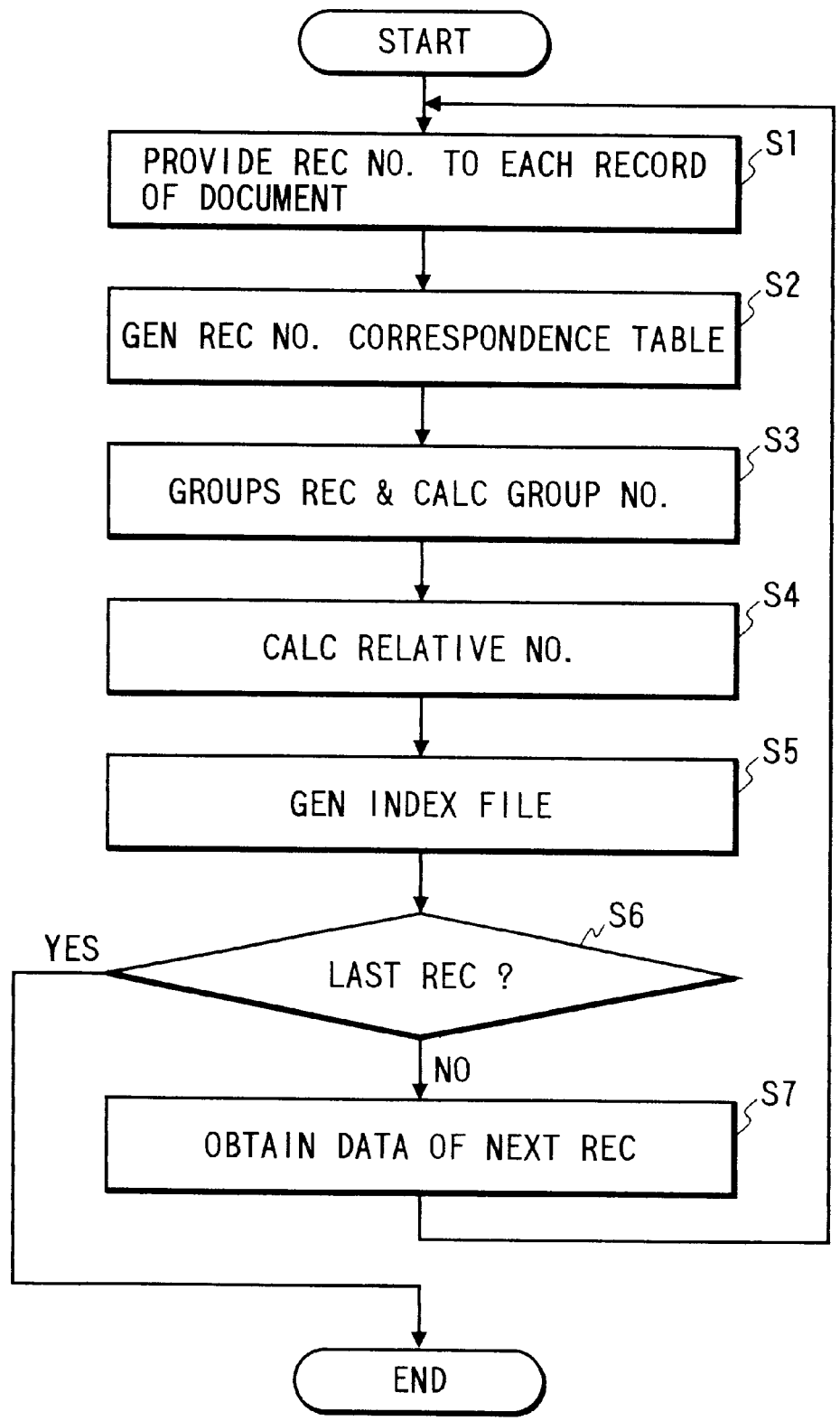
FIG. 2 shows a flow chart of the first embodiment which is also referred in second and third embodiments.

An operation of the first embodiment will be described. FIG. 2 shows a flow chart of the first embodiment which is also referred in second and third embodiments. FIG. 3 is an illustration of this embodiment showing an example condition of recorded documents. FIG. 4 is an illustration of this embodiment showing an example condition of a correspondent table.

A cpu (a central processing unit included in the data searching apparatus but is not shown) included in this data searching apparatus executes programs as shown by the flow chart in FIG. 2.

When a user registers a document, the request receiving portion 1 receives a document registration request and in response to this, the record number providing portion 2 provides a record number to each of records which is a unit of data to be registered in step s1. That is, a document which is data to be registered includes pages and every page is dealt as a record which is provided with a record number.

For example, if documents are registered as shown in FIG. 3, page one of a document D1 is provided with a record number 1; page two of the document D1, a record number 2; and page one of a document D2, a record number 3.

The cpu generates table data for the record number correspondence table representing the relation among the record numbers, document numbers, and page numbers. The cpu renews the record number correspondence table using the table data and stores the renewed record number correspondence table in the correspondence table storing portion 3 in step s2. When the document shown in FIG. 3 is registered, a data condition of the record number correspondence table is as shown in FIG. 4.

The cpu groups the records in step s3. It is assumed that 65536 records are grouped into one group, the group number is given by:

group number=<record number/65536> where < > represents a quotient, that is, the group number is an integer provided by omitting fractions of the record number/65536.

In the following step s4, a relative record number in the group is given by:

The relative record number=record number % 65536
where the operator % represents a remainder.

Figure 5:
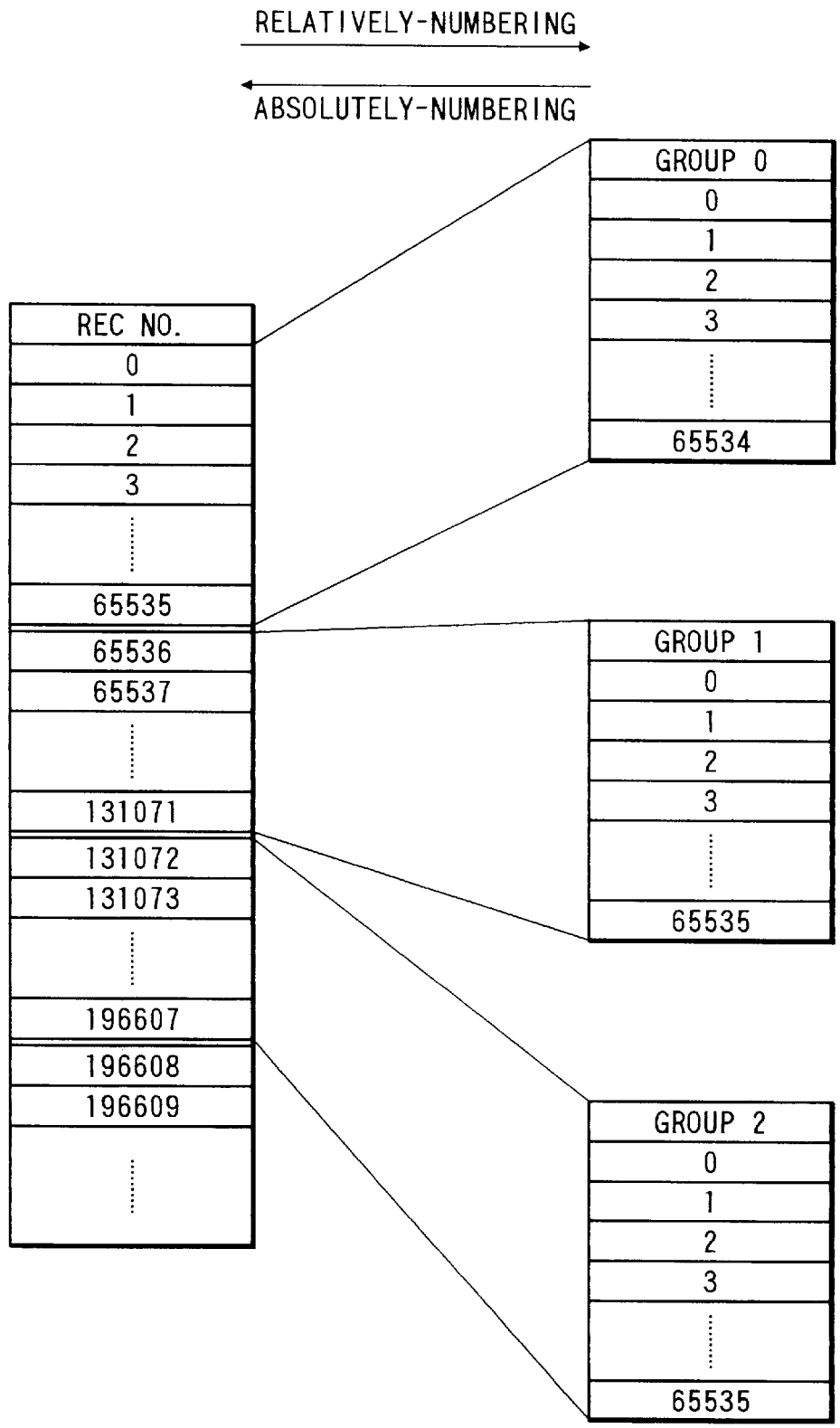
FIG. 5 is an illustration of the first embodiment showing a relation between the absolute record numbers and the relative numbers.

As shown in FIG. 5 which is an illustration of this embodiment showing a relation between the absolute record numbers and the relative number, the absolute record numbers are converted into relative numbers. For example, an absolute record number 65537 is converted into a relative record number 1 in the group one and an absolute record number 13072 is converted into a relative record number 0 in group two.

Then, the cpu generates index file in step s5. FIG. 6 is an illustration of this embodiment showing the index file. The index file includes the number of appearance times data of two characters in a character chain including two characters.

FIG. 7A is an illustration of the first embodiment showing a relation between a train of characters and the number of appearance times;

FIG. 7B is an illustration showing a relation between a character chain including two predetermined characters and the number of appearance times data.

It is assumed that the registered data is "abaabcac", the number of appearance times of respective characters are shown in FIG. 7A. Then, the registered data is divided such that character chains are successively provided from the top of the registered data with overlapping. That is, the character train is sectioned every two characters, wherein sectioning point is shifted every one character. Then, the first character chain is (a, b) and the number of appearance times data is (1, 1). The following character chain is (b, a), and the number of appearance times data is (1, 2). Similarly, the cpu obtains the number of appearance times data of all character chains.

FIG. 8 is an illustration of this embodiment showing an index file. It is assumed that registered data in the record number 1 in the group 1 is "ababcbcababc", registered data in the record number 2 in the group 1 is "bbaabbcabc", registered data in the record number 1 in the group 2 is "bcababcbc", registered data in the record number 2 in the group 2 is "acbcabbaabc". The cpu calculates the number of appearance times with respect to character chain (a, b) and (b, c) as shown in FIG. 8.

The cpu repeatedly executes steps s1 to s7 to generate the index files as mentioned until the last record is processed to provide the index files. That is, the cpu determines whether the last record is processed in step s6. If the record is last, processing ends. If the record is not last, processing returns to step s1.

A searching processing will be described.

Figure 9:
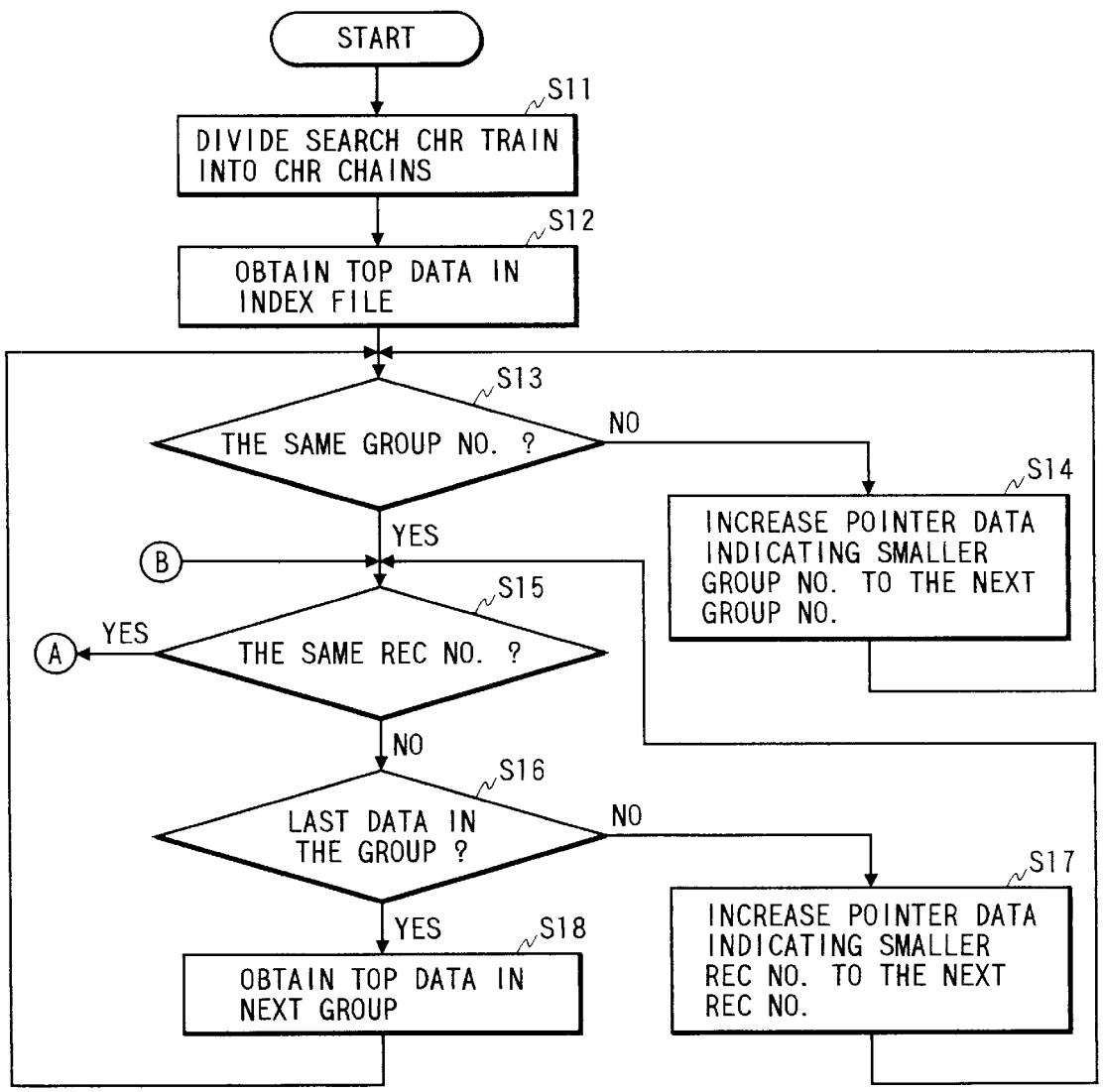
FIGS. 9 and 10 show a flow chart of a searching processing of the first embodiment.
Figure 10:
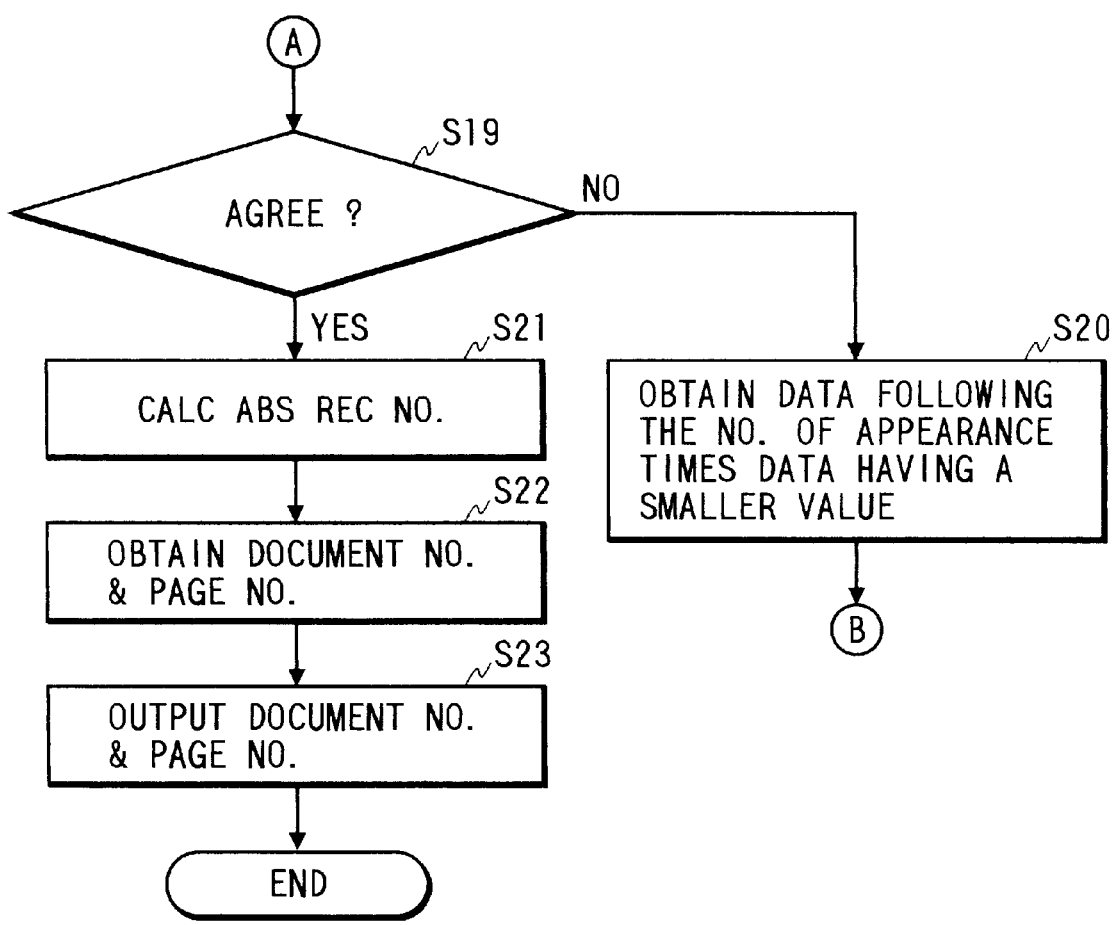

FIGS. 9 and 10 shows a flow chart of a searching processing of this embodiment.

When the user inputs a searching request including data of a character train to be searched (search character train), the request receiving portion 1 receives the searching request and supplies the data of the search character train to the index file searching portion 7. The index file searching portion 7 divides the character train into the character chains.

If the searching character train is "abc", the index file searching portion 7 divides it into character chains (a, b) and (b, c) in step s11. The index file searching portion 7 obtains top appearance times data of the character chains (a, b) and (b, c) from appearance times data files of character chain (a, b) and character chain (b, c) at top positions of respective files in the index file storing portion 6 in step s12. The positions are provided by pointers of the index files.

In the case of FIG. 8, at record number 1 in the group one, the number of appearance times data of the character chain (a, b) is (1, 1) and the number of appearance times data of the character chain (b, c) is (2, 1). Therefore, the index file searching portion 7 obtains the number of appearance times data (1, 1) of the character chain (a, b) and the number of appearance times data data (2, 1) of the character chain (b, c) from the index file storing portion 6.

Then, the index file searching portion 7 compares the group numbers of obtained the number of appearance times data of character chains (a, b) and (b, c) in the index file storing portion 6 in step s13. If the obtained the number of appearance times data are not the same, the index file searching portion 7 increases either of the pointers of the index file of the character chains (a, b) and (b, c) existing in a group having a smaller group number to the top of the number of appearance times data in the next group and repeats the steps s13 and s14. If the group numbers of the obtained the number of appearance times data of character chains (a, b) and (b, c) are the same, the index file searching portion 7 compares the record numbers of the obtained number of appearance times data in step s15.

In the case of FIG. 8, because both group numbers are 1, the index file searching portion 7 compares the record numbers.

If the relative record numbers are different from each other in the same group, the index file searching portion 7 determines whether the obtained the number of appearance times data is the last data in the group in step s16. If the obtained the number of appearance times data is not the last data in the group, the index file searching portion 7 obtains the following number of appearance times data having the smaller record number in the group in step s17. The index file searching portion 7 repeats the processing from the steps s15 to s17. If obtained the number of appearance times data is the last data in the group, the index file searching portion 7 obtains the number of appearance times data at the top of the following group in step s18 and repeats processing from step s13 to step s18. If the record number in the group are the same, the index file searching portion 7 compares the number of appearance times data in step s19.

In the case of FIG. 8, because the both record numbers in the group are 1, the index file searching portion 7 compares the number of appearance times data.

The index file searching portion 7 compares the number of appearance times data as follows:

The number of appearance times of character "b" in the character chain (a, b) is compared with the number of appearance times data of character "b" in the character chain (b, c). If both the number of appearance times data agree with each other, character "b" in the character chain (a, b) is the same character as character "b" in the character chain (b, c). This means these two character chains are a continue character train, that is, there is a character train "abc".

If both the number of appearance times do not agree with each other, the index file searching portion 7 obtains the number of appearance times data of the character chain following to the character chain having a smaller number of appearance times data in step s10, and repeats the processing from step s5.

In the case of FIG. 8, because the number of appearance times data of (a, b) is (1, 1) and that of (b, c) is (2, 1), and thus the number of appearance times of the second character (b) of the character chain (a, b) does not agree with that of the first character (b) of the character chain (b, c) (COM1), the index file searching portion 7 obtains the number of appearance times data of the record number 1 in the same group, (2, 2), following to the character chain (a, b) having the number of appearance times having a smaller value.

Then, because both the number of appearance times data are in the same record record number and the same group, the index file searching portion 7 compares both appearance frequency data (COM2). Because both the number of appearance times data are 2, there is the character train "abc" to be searched.

When the number of appearance times data agree with each other, that is, if there is the character train to be searched, the record number is calculated from the group number and the record number by the following equation in step s11.

record number=65536*group number+record number in the group

Then, the index file searching portion 7 obtains, in step s12, the document number and the page number from the record number using the correspondence table shown in FIG. 4 which is stored in the record number correspondence table storing portion 3.

In the following step s13, the index file searching portion 7 outputs the document number and the page number obtained in step s12 as the document number and the page number to be searched. This processing is repeated until the final data is processed.

The index file generation portion 5 generates the index file including at least a header 60 for storing each of the group number data and the index data areas 62 following to the header 60 for storing relative record number data and corresponding the index data. The header 60 and each of the index data areas 62 have the same size.

As mentioned, in the data search apparatus of this embodiment, when a document is registered, the record numbers are assigned to every page, the record numbers are grouped and converted into relative record numbers to be controlled, so that the record numbers in the same range can be repeatedly used every group.

In this embodiment, the index file is provided by the number of appearance times data of character chains including two characters. However, appearance representing appearance of character chains, such as absolute position data of character chains can be used for the index file. Further, in this embodiment, one record of registration is provided every page. However, it is also possible to provide one record every predetermined section, such as, every document, every sentence, or every paragraph which are sectioned by sectioning data such as the periods or the like.

A second embodiment will be described.

Figure 11:
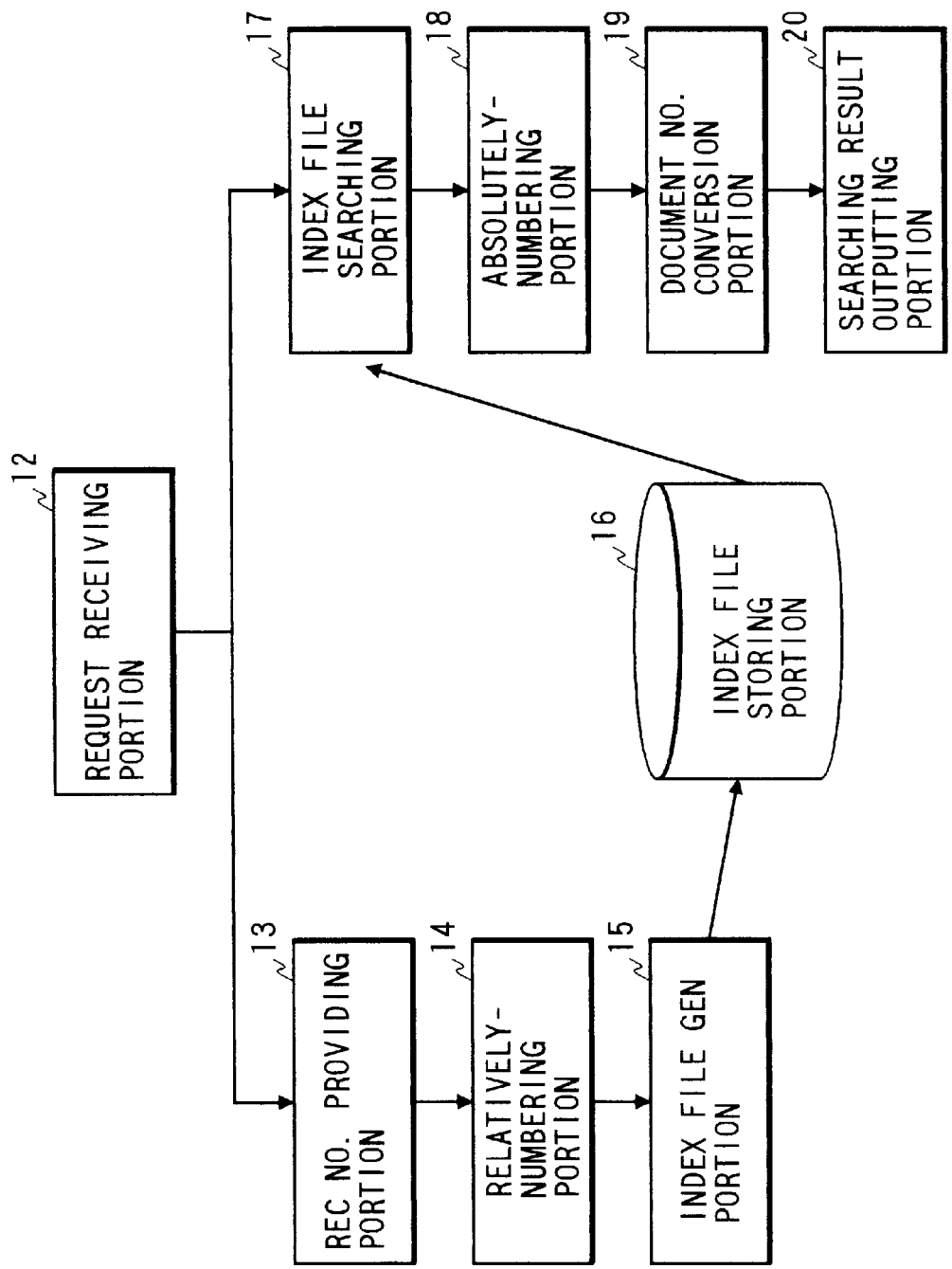
FIG. 11 is a block diagram of a data search apparatus of a second embodiment.

FIG. 11 is a block diagram of a data search apparatus of the second embodiment.

The data search apparatus of the second embodiment comprises a request receiving portion 12 for receiving requests for various processings, a record number providing portion 13 for providing a record number in accordance with a rule uniquely determining a record number from a document number and a page number, a relative numbering portion 14 for grouping record numbers provided by the record number providing portion 13, an index file generation portion 15 for generating an index file including relative record number converted by the relative numbering portion 14 and data to be registered, an index file storing portion 16 for storing the index files generated by the index file generation portion 15, an index file searching portion 17 for effecting searching data using the index files stored in the index file storing portion 16, an absolute numbering portion 18 for converting the relative record number of the record searched by the index file searching portion 17 into an absolute number, a document number conversion portion 19 for providing a document number and a page number from the record number through an inversion conversion of the conversion effected by the record number providing portion 13, and a search result output portion 20 for outputting the document number as the search result.

Figure 12:
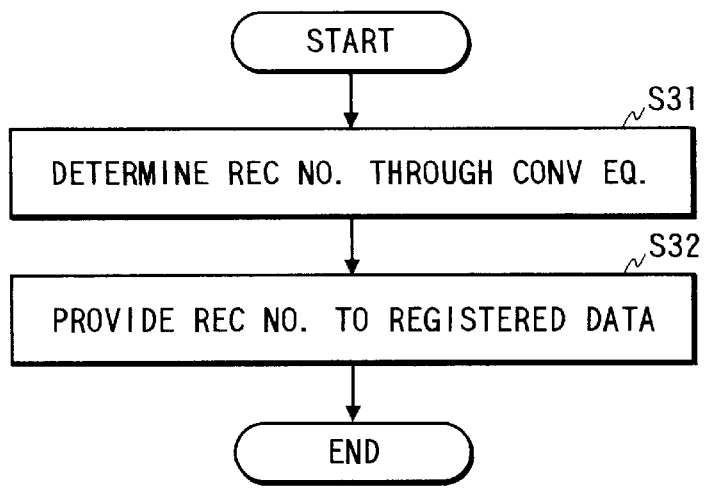
FIG. 12 shows a flow chart of the second embodiment showing a document registering operation.

At first, an operation of registering a document will be described. FIG. 12 shows a flow chart of the second embodiment showing a document registering operation. FIG. 13 is an illustration of the second embodiment showing record numbers of documents.

When the user inputs a registration request to the request receiving portion 12, the request receiving portion 12 receives this registration request. Then, the record numbering portion 13 provides a record number through the rule uniquely determining a record number from the document number and the page number. The record number is calculated from the following equation.

record number=(document number−1)*the maximum number of pages of one document+page number where a record number can be uniquely determined by setting the number of pages in one document to a predetermined number as shown in FIG. 13.

The processing for registering a document after this processing is similar to the processing from step s3 to s8 shown in FIG. 2.

The searching operation is effected by processing shown in FIGS. 9 and 10 basically. However, the document number and the page number are calculated from the record number in step 12 through the following equation.

Document number P record number/the maximum number of pages of one document+1

Page number=record number % the maximum page number of one document

As mentioned, in the data searching apparatus of the second embodiment, a lot of amount of record numbers can be controlled by grouping record numbers and controlling with relative record numbers, so that it is possible to assign a page number through the rule uniquely determining the record number from the maximum page number of one document and the page number. Therefore, it is not necessary to generates the correspondence table which was necessary in the first embodiment. Moreover, if the number of pages increases by renewing the document, the numbering of the record number can be regularly provided within the predetermined maximum pages.

Moreover, other conversion to the record number is applicable to this embodiment if it uniquely determines the record number from the document number and the page number such as:

Record number=a maximum number of documents*(the number of pages−1)+document number A third embodiment will be described.

The structure and operation of the third embodiment are similar to the first embodiment. The difference between the first and third embodiment is that the inserting region generation portion 11 is further provided. The inserting region generation portion 11 generates an inserting region and stores the number of appearance times data in the inserting region while the index file generation portion 5 stores the index file in the index file storing portion 6.

A registering operation of a document is effected as similar to the processing from step s1 to step s4 shown in FIG. 2.

Figure 14:
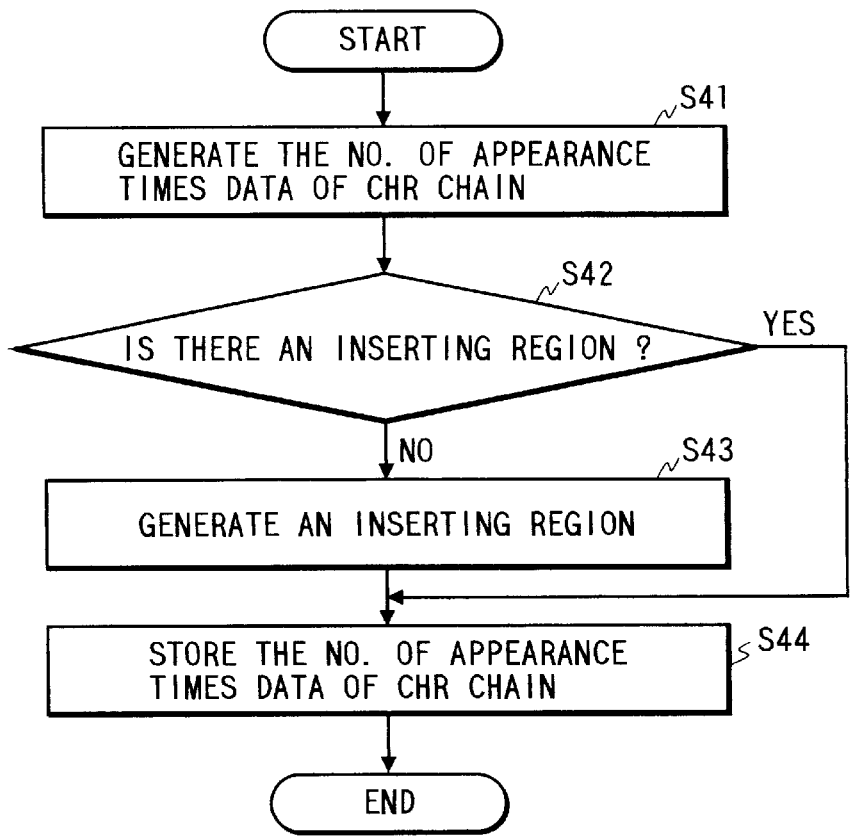
FIG. 14 shows a flow chart of a third embodiment showing an index file generation processing.

FIG. 14 shows a flow chart of the third embodiment showing an index file generation processing.

In step s41, the index file generation portion generates the number of appearance times data of a character chain including two characters as similar to the first embodiment. The index file generation portion 5 determines whether there is no inserting region for storing the number of appearance times data in step s42. If there is no inserting region for storing the number of appearance times data, the inserting region generation portion 11 generates a predetermined size of a storing region in step s43. If there is an inserting region for storing the number of appearance times data in step s42, the index file generation portion 5 stores the number of appearance times data in the inserting region in step s44.

FIG. 15 is an illustration of the third embodiment showing index files. FIG. 16 is an illustration of the third embodiment showing data for generating an index file.

It is assumed that a sentence having a record number 1 in a group 1 is "ababcbcababc", a sentence having a record number 2 in the group 1 is "bbaabbcabc", a sentence having a record number 1 in the group 2 is, "bcababcbc", and a sentence having a record number 2 in the group 2 is "acbcabbaabc". Then, the index file generation portion 5 generates index files representing the number of appearance times data of the character chain (a, b) as similar to the first embodiment and further inserting regions having the predetermined size are inserted into every group as shown in FIG. 16.

The cases of adding the number of appearance times data to the index files are that a document is further registered and that a document which has been registered is renewed and thus, the number of appearance times data should be renewed.

The data registration processing after this processing is effected as similar to the processing from steps s6 to s7 of the first embodiment as shown in FIG. 2 to complete the data registration processing.

The searching operation is effected as similar to the processing shown in FIGS. 9 and 10.

As mentioned, in the data searching apparatus of the third embodiment, inserting regions having the predetermined size are generated. Therefore, if a registered document is renewed or a new document is further registered, it is possible to add the number of appearance times data in the inserting region, so that it is prevented to decrease the speed of registration due to insertion of data.

In this embodiment the record number is provided by relative numbering. However, it is also possible to control the record number with general record numbers which are not relatively numbered.

What is claimed is:

1. A data searching apparatus comprising:

input means for receiving a searching request including searching request data and a registering request;

sectioning means responsive to said registering request from said input means for generating sectioning data to be registered into units of records in accordance with sectioning data included in said data;

numbering means for grouping and numbering said records such that every predetermined number of said records are grouped into one group and for generating group number data and relative record number data resulting from the numbered and grouped records;

storing means for storing said group number data and said relative record number data correspondingly; and searching data generation means for generating and outputting searching data to be used for searching one of said record in accordance with said searching request data from said input means and said group data and relative record number data in said storing means.

2. A data searching apparatus comprising:

request receiving means for receiving a searching request, including searching data, and a registering request;

record number providing means responsive to said registering request for providing record number data to each record which is a unit of data to be registered;

relative-numbering means for grouping said record number data into groups and converting said record number data into group number data and relative record number data within each of said groups;

index file generation means for generating an index file from said data and said relative record number data;

index file storing means for storing said index file;

index file searching means for searching one record indicated by said searching data in accordance with said index file in said index file storing means in response to said searching request from said request receiving means;

absolute-numbering means for converting the relative number data and group number data of said searched record into said record number data; and searching result outputting means for outputting a searching result in accordance with the record number data from said absolute numbering means.

3. A data searching apparatus as claimed in claim 2, wherein said record number providing means generates a record number correspondence table indicative of a correspondence between said record number data and page numbers indicated by sectioning data included in said data and said searching result outputting means outputs said searching result from said record number data from said absolute numbering means in accordance with said record number correspondence table.

4. A data searching apparatus as claimed in claim 2, wherein said index file generation means generates said index file including a t least a header for storing each of said group number data and said index data areas following to said header for storing relative record number data and corresponding index data, said header and each of said index data areas having the same size.

5. A data searching apparatus as claimed in claim 2, further comprising insertion area generation means for providing a storing space in said index storing means to store said index data in said index file storing means in future when said index file storing means stores said index file.

6. A data searching apparatus as claimed in claim 2, wherein said index file generation means generates a record number correspondence table indicative of a correspondence between said record number data and document number and page numbers of said document indicated by sectioning data included in said data and said searching result outputting means outputs said searching result from said record number data from absolute numbering means in accordance with said record number correspondence table.

7. A data searching apparatus comprising:

request receiving means for receiving a searching request and a registering request;

record number providing means responsive to said registering request for providing a record number to each of records which is a unit of data to be registered in accordance with sectioning data included in said data through a rule uniquely defining said record number data;

relative-numbering means for grouping said records such that said record numbers and at least one spare record form one of said groups and for generating group number data and corresponding relative number data from the grouped record numbers;

index file generation means for generating an index file from said data using said relative record number data and said group number data;

index file storing means for storing said index file;

index file searching means for searching one of records indicated by said searching request in accordance with said index file in said index file storing means in response to said searching request from said request receiving means;

absolute-numbering means for converting the relative number data and group number data of said searched one of records into said record number data; and searching result outputting means for outputting a searching result in accordance with the record number data from said absolute-numbering means.

8. A data searching apparatus as claimed in claim 7, further comprising insertion area generation means for providing a storing space in said index file storing means to said index data in said index file storing means in future when said index file storing means stores said index file.

* * * * *